(12) United States Patent
Vives et al.

(10) Patent No.: US 6,334,639 B1
(45) Date of Patent: Jan. 1, 2002

(54) BUMPER EQUIPPED WITH SHOCK-ABSORBING MEANS

(75) Inventors: Michel Vives, Saint Ambroix; Philippe Le Breton, Bourges, both of (FR)

(73) Assignee: Giat Industries (FR)

( * ) Notice: Subject to any disclaimer, the term of this patent is extended or adjusted under 35 U.S.C. 154(b) by 0 days.

(21) Appl. No.: 09/743,323
(22) PCT Filed: Jun. 22, 1999
(86) PCT No.: PCT/FR99/01487
§ 371 Date: Jan. 9, 2001
§ 102(e) Date: Jan. 9, 2001
(87) PCT Pub. No.: WO00/02751
PCT Pub. Date: Jan. 20, 2000

(30) Foreign Application Priority Data

Jul. 9, 1998 (FR) .................................. 98 08866
Jul. 9, 1998 (FR) .................................. 98 08865

(51) Int. Cl.[7] .................................................. B60K 19/34
(52) U.S. Cl. .................. 293/133; 293/107; 293/109; 293/110; 293/120; 293/121; 293/132; 293/134
(58) Field of Search .................... 293/107, 109, 293/110, 120, 121, 132, 133, 134, 4

(56) References Cited

U.S. PATENT DOCUMENTS

| | | | | |
|---|---|---|---|---|
| 2,977,146 A | * | 3/1961 | Edwards et al. ............. | 293/134 |
| 3,718,332 A | * | 2/1973 | Jones ......................... | 293/134 X |
| 3,947,061 A | * | 3/1976 | Ellis ................................... | 293/5 |
| 4,031,978 A | * | 6/1977 | Taylor ............................ | 280/232 |
| 4,518,183 A | | 5/1985 | Lee | |
| 5,106,137 A | | 4/1992 | Curtis | |
| 5,218,919 A | * | 6/1993 | Krulikowski, III et al. . | 293/133 X |
| 5,460,421 A | * | 10/1995 | Culbertson .................... | 293/133 |
| 6,203,061 B1 | * | 3/2001 | Neiderman et al. ......... | 280/736 |

FOREIGN PATENT DOCUMENTS

| | | |
|---|---|---|
| DE | 25 23 546 | 12/1976 |
| DE | 195 14 191 A1 | 9/1995 |
| DE | 195 12 600 | 10/1996 |
| EP | 0 332 830 | 9/1989 |
| EP | 0 850 807 | 7/1998 |
| FR | 2 110 794 | 6/1972 |
| JP | 8-332909 | 4/1997 |
| WO | 97/47496 | 12/1997 |

* cited by examiner

Primary Examiner—Joseph D. Pape
Assistant Examiner—Lori L Coletta
(74) Attorney, Agent, or Firm—Parkhurst & Wendel, L.L.P.

(57) ABSTRACT

A vehicle bumper with shock-absorbers, including a rigid support attached to a vehicle onto which a bumper shell is fitted, the shock-absorbers including at least two pyrotechnic actuators linking the rigid support to the vehicle, the actuators being connected for activation by a control system including an impact or deceleration sensor, and each pyrotechnic actuator including at least two gas-generating powder tablets to be primed individually by the control system.

10 Claims, 7 Drawing Sheets

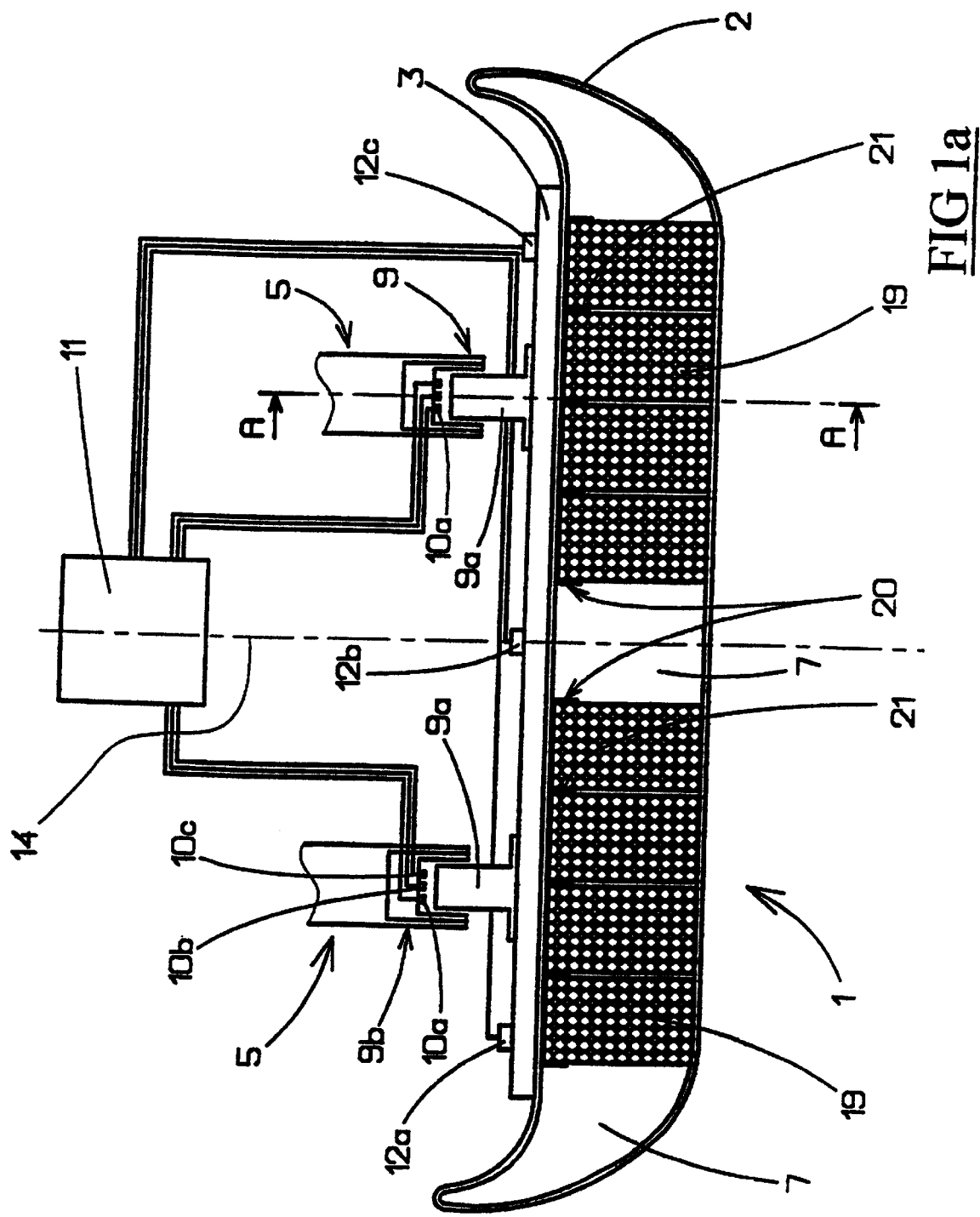

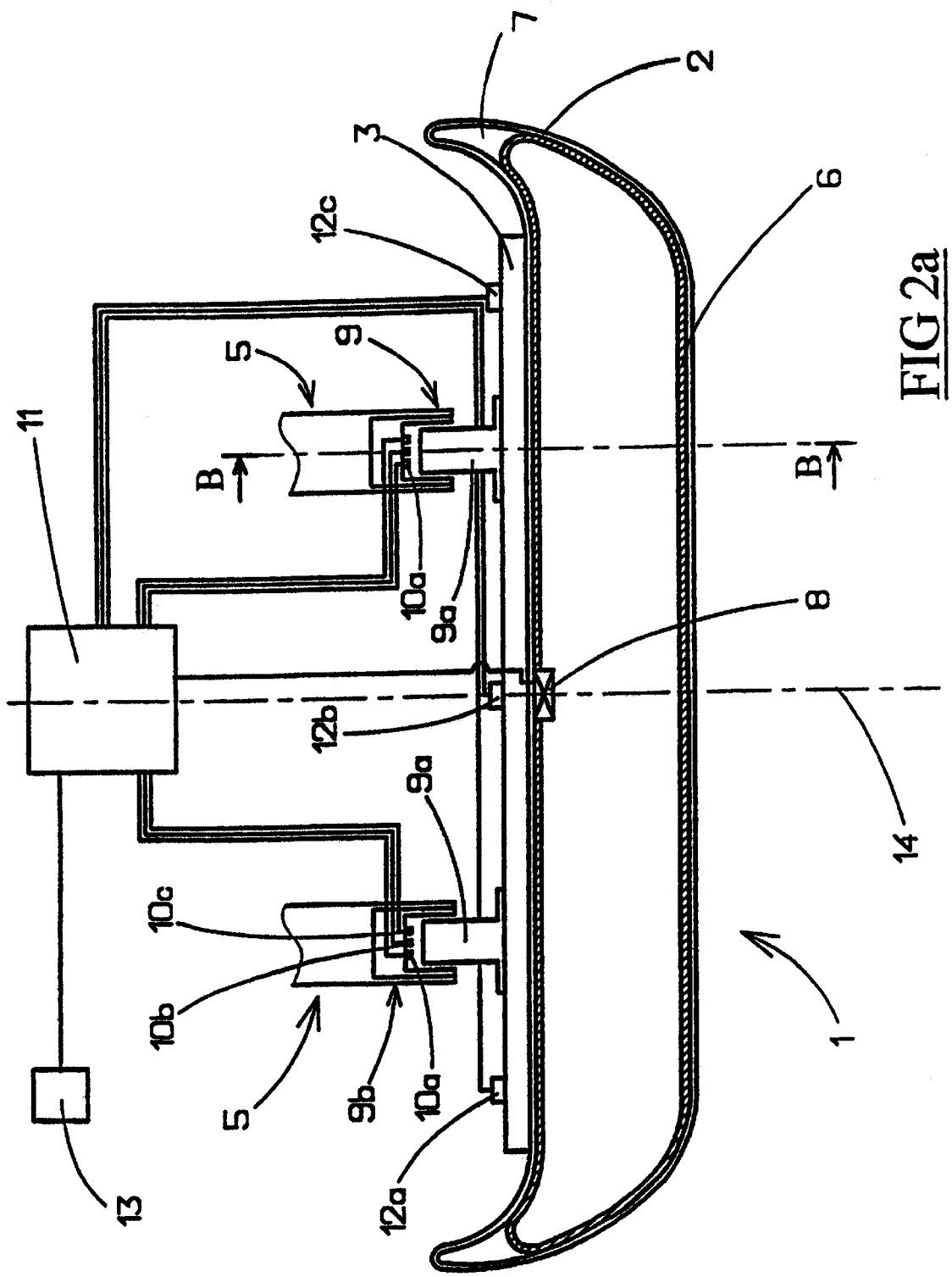

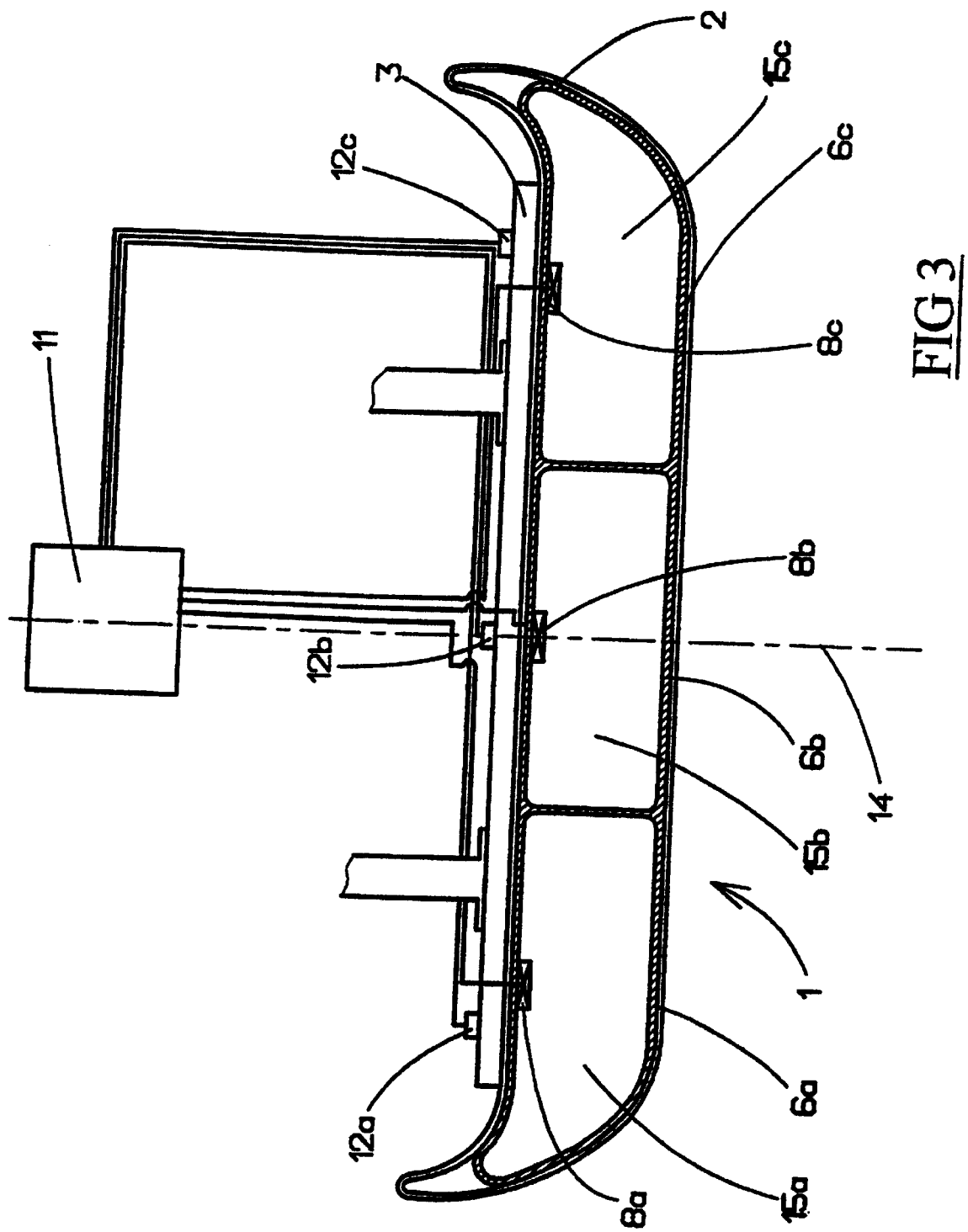

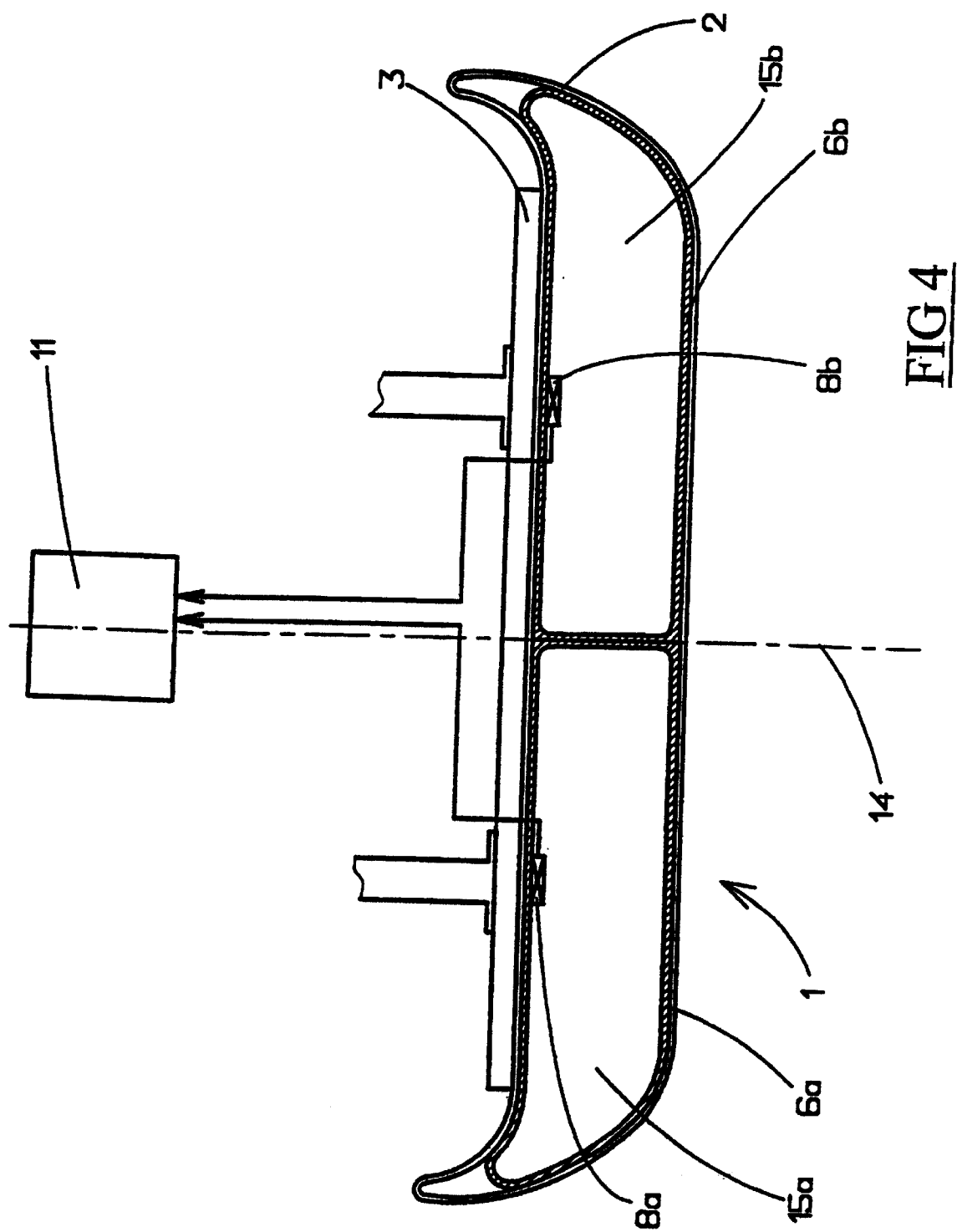

BUMPER EQUIPPED WITH SHOCK-ABSORBING MEANS

FIELD AND BACKGROUND OF THE INVENTION

The technical scope of the invention is that of bumpers for vehicles, and notably for motor vehicles.

Existing bumpers do not allow impacts to be absorbed that occur when the vehicle is at a speed greater than 15 km/h without damage to the body.

So as to restrict the violence of frontal impacts it is known to design bumpers fitted with shock-absorbing means.

Thus, patents U.S. Pat. Nos. 3,822,076 and 3,708,194 show vehicles fitted with an inflatable bag that is deployed to the front of the bumper in the event of sudden deceleration. This bag allows part of the kinetic energy to be absorbed and protects the vehicle's occupants.

Said devices employing deployable bags are complicated to implement. To protect the vehicle, the bag must have a substantial volume when inflated and is thus not able to deploy both rapidly and reliably. Additionally, the folded bag must only occupy a small amount of space, its casing is therefore thin and not very strong. It will burst upon impacting an obstacle and will therefore afford little protection.

Another problem with known systems lies in that they only provide a single level of shock-absorption for the bumper. Said bumper is therefore not able to be suitably adapted to various situations whether related to the intensity of impact or its position with respect to the median axis of the vehicle.

An impact located on one of the sides of the bumper can thus be noted to cause the vehicle to wrap itself around the obstacle thereby seriously prejudicing the safety of the vehicle's occupants.

Patent U.S. Pat. No. 5,651,569 describes another device in which the bumper incorporates a reinforced rubber bag that is permanently inflated by means of a compressible fluid and that is encased in a metal shell.

The bag is inflated when the bumper is mounted onto the vehicle and it allows the impacts received by the bumper to be distributed and absorbed by the compression of said fluid.

However, such a device suffers nevertheless from certain drawbacks.

Thus, the bag is likely to gradually deflate over time, thereby reducing its shock-absorbing capabilities.

Additionally, such a system provides a single level of shock-absorption for the bumper. It is therefore not able to be suitably adapted to various situations whether related to the intensity of impact or its position with respect to the median axis of the vehicle.

Patents DE19514191 and EP850807 describe bumpers that are attached to the vehicle by means of pyrotechnically controlled actuators. Such systems are also unable to be suitably adapted to various situations whether related to the intensity of impact or its position with respect to the median axis of the vehicle.

BRIEF SUMMARY OF THE INVENTION

Thus, the bumper proposed by the invention provides greater shock-absorbing capabilities that can be modulated according to the force and/or position of the impact received.

The invention thus relates to a bumper for a vehicle fitted with shock-absorbing means, and comprising a rigid support linked to the vehicle onto which a shell intended to receive the impacts is fitted, said shock-absorbing means comprising at least two pyrotechnic actuators linking the rigid support to the vehicle, said actuators being activated by a control system linked to at least one impact and/or deceleration sensor, said bumper being characterised in that each pyrotechnic actuator incorporates at least two gas-generating powder tablets able to be primed individually by the control system so as to provide the actuator with at least two efforts of different intensities.

The control system will be advantageously linked to means allowing the position of the impact received by the vehicle to be located with respect to the median axis of the vehicle, and the control system will then initiate the nearest actuator to the point of impact with a greater effort than that transmitted to the actuator furthest away.

The impact-locating means will be advantageously constituted by the spacing of at least two impact sensors on either side of the median axis of the vehicle.

According to a first embodiment of the invention, the bumper incorporates at least one block of shock-absorbing material placed between the rigid support and the shell.

Each shock-absorbing block can be formed of hollow balls arranged in a matrix of plastic material, said balls being crushed under impact to the shell.

According to a second embodiment of the invention, the shock-absorbing means comprise at least one inner volume in the shell that can be pressurised by means of a compressible fluid supplied by at least one generator initiated by the control system linked to at least one impact and/or deceleration sensor.

Advantageously, the pressurizable volume can comprise at least one casing made of an elastic material such as rubber, reinforced or not, the casing being arranged between the rigid support and the shell.

The casing can incorporate longitudinal and/or transversal partitions delimiting at least two inner cavities in the casing.

The fluid generator or generators intended to inflate the casing or casings will preferably be pyrotechnic gas generators.

According to another embodiment, the device can incorporate two gas generators.

In this case, the control system will initiate one or other gas generator according to a different level of impact or deceleration.

BRIEF DESCRIPTION OF THE DRAWINGS

The invention will be better understood after reading the following description of the different embodiments, such description being made with reference to the appended drawings, in which:

FIG. 1a is a longitudinal section view of a bumper according to the invention;

FIG. 1b is a transversal section view of this same bumper along plane AA marked out in FIG. 1a;

FIG. 2a is a longitudinal section view of a bumper according to a second embodiment of the invention;

FIG. 2b is a transversal section view of this same bumper along plane BB marked out in FIG. 2a;

FIG. 3 is a longitudinal section view of a bumper according to a third embodiment of the invention;

FIG. 4 is a longitudinal section view of a variant embodiment of the bumper according to the invention;

DETAILED DESCRIPTION OF THE INVENTION

Figure 1B:
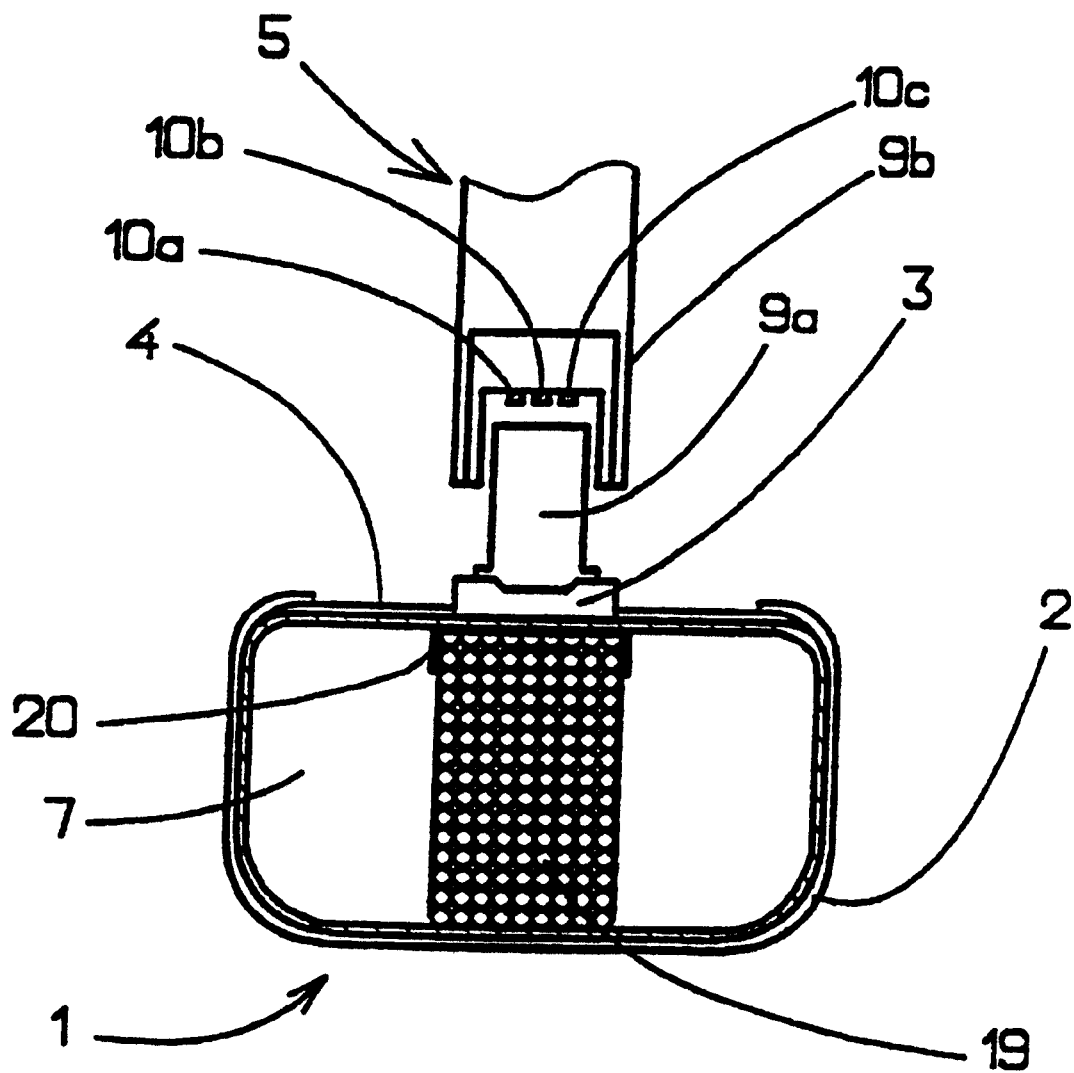

With reference to FIGS. 1a and 1b, a bumper 1 according to the invention is arranged to the fore or rear of the vehicle, and comprises a shell 2, made of a plastic or composite material, intended to receive impacts. This shell is fastened to a rigid support 3 by linking means, not shown in detail, and that can comprise, for example, several supports 4, evenly spaced longitudinally, riveted or bonded to the shell, and screwed to support 3.

The rigid support 3 is a bar, made of composite materials or steel, that is linked to the vehicle chassis (not shown) by two arms 5.

The inner volume 7 of the shell 2 encloses several substantially parallelepiped blocks 19 of a shock-absorbing material formed by hollow balls (of metal or of a plastic material such as epoxy-based polymer) of 12 to 15 mm in diameter, said balls being arranged in a resin matrix.

Such shock-absorbing blocks are well known to the expert, notably by patents EP212712 and EP359769, and are not described hereafter in any further detail.

In this example, the shell encloses eight identical shock-absorbing blocks separated into two groups. A first group of four blocks is arranged at the right side of the shell and a second group of four blocks is arranged at the left side, the blocks being arranged symmetrically to each other with respect to the median axis 14 of the vehicle.

Each group 19 of blocks is placed opposite one of the arms 5.

Blocks 19 are fastened to the rigid support 3 by a rectangular base plate 20 made of plastic or metal and having partitions 21 delimiting housings for each block. The base plate is screwed onto support 3 and the blocks are fitted into and can be bonded to base plate 20.

Blocks 19 are of a length such that their upper face presses against the inner wall of the shell 2.

Each arm 5 comprises a pyrotechnic actuator 9 that has a rod 9a fastened to the rigid support 3 and a body 9b linked to the vehicle. The rod 9a is able to slide with respect to the body 9b under the effect of the gases generated one or several tablets 10a, 10b, 10c of gas-generating composition.

A specific pyrotechnic squib (not shown) can individually initiate each composition tablet. The tablets are isolated from one another so that initiating one of them does not in turn initiate the others.

Each tablet can thus be positioned in a gas-tight case (not shown) having a lid that can be fractured by the gas pressure.

An electronic control system 11, integral with the vehicle, receives the signals transmitted by impact sensors 12a, 12b, 12c that are advantageously integral with the rigid support 3 or else with the shell 2 itself. The impact sensors are evenly spaced over the length of the bumper for reasons that will be explained after.

A sensor (12a, 12c) can, for example, be placed in the vicinity of each bumper end and another sensor 12b in the median part.

The impact sensors will, for example, be constituted by fracture pins associated with electromechanical or piezo-electric contacts. These will be assembled such that fracturing the pin (occurring during impact) causes the closure or opening of the contact.

Sensors in the form of electrical contacts integral with the bar 3 can also be adopted that are fractured when said bar undergoes a certain level of strain. Stress gauges or contactor sensitive to a certain level of deceleration the vehicle can also be used.

The signals transmitted by sensors 12a, 12b, 12c are processed by the system 11 that incorporates a suitable algorithm allowing the initiation of one or several tablets 10a, 10b, 10c to be controlled.

Advantageously, the control system 11 will also ensure the activation of the other safety systems of the vehicle (inflation of driver and/or passenger airbags, seat belt pretensioners, . . . ).

Such a bumper operates as follows.

Classically, the bumper shell structure enables it to absorb a shock occurring at a speed of less than 4 km/h. The rigidity of block 19 also allows the shock received by the shell to be spread over the whole structure and notably over the full length of the rigid support 3.

When the speed exceeds 4 km/h, the shell 2 deforms and crushes the shock-absorbing blocks 19, that thus absorb part of the energy of impact.

Using such a shock-absorbing material it is possible for the energy corresponding to an impact occurring at a speed less than or equal to 15 km/h to be absorbed.

Sensors 12a, 12b, 12c detect impact occurring at speeds of over 15 km/h.

Further to their detection, the control system 11 controls the initiation of one or several tablets 10a, 10b, 10c of gas-generating composition. The pyrotechnic actuators 9 are thus activated and allow the extra energy from the impact received to be absorbed.

Because of the presence of several impact sensors 12a, 12b, 12c spaced along the length of the bumper, the control system is able to locate the position of the impact received by the vehicle with respect to its median axis 14.

Indeed, in the case of an offset impact, and according to the sensor technology used, the signal transmitted by the impact sensor that is closest to the point of impact will be the strongest, or else the impact sensor closest to the point of impact will fracture the first.

At least two impact sensors will be provided, one on either side of the median axis 14. Each of these sensors will thus more easily detect an impact occurring on one side or the other of the median axis, thus on the right or left of the vehicle.

The control system 11 will then control the initiation of a greater number of tablets 10 for the pyrotechnic actuator 9 closest to the point of impact (for example, the three tablets 10a, 10b, 10c of the closest actuator and a single tablet for the one that is furthest away).

The effort produced by the closest actuator to the point of impact will thus be greater than that produced by the actuator that is furthest away. Such an arrangement allows the absorption of the shock to be adapted according to the position of impact with respect to the median axis 14 of the vehicle thereby preventing the vehicle from wrapping around an offset obstacle.

By way of a variant, it is possible for impact sensors to be provided that allow several impact speeds over 15 km/h to be differentiated and consequently a different number of gas-generating composition tablets to be initiated according to the violence of impact.

The higher the speed of impact, the more gas-generating composition tablets will be initiated.

By way of a variant, it is possible for shock-absorbing materials to be provided other than block of hollow balls 19, for example porous materials.

Figure 2B:
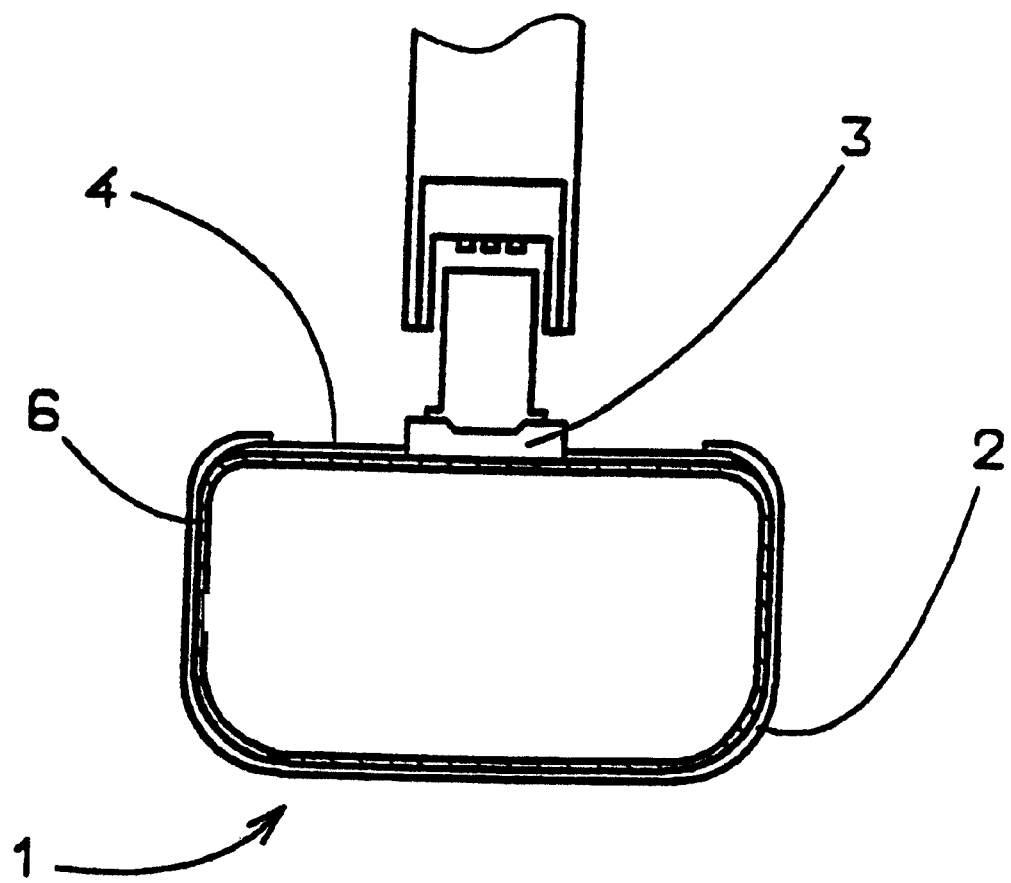

FIGS. 2a and 2b show a second embodiment of a bumper 1 according to the invention.

In accordance with this embodiment, the shell 2 delimits an inner volume 7 inside which there is a casing 6 made of an elastic material, for example rubber, that can be reinforced. The casing 6 is fastened to support 3, for example by bonding or duplicate moulding, and has an opening at which a pyrotechnic gas generator 8 is placed in a gastight manner. In the starting position shown in FIGS. 2a and 2b, the casing 6 is pre-inflated under moderate pressure and thus substantially fills the whole inner volume of the shell 2. Such an arrangement is intended to reduce the reaction time of the device according to the invention, tho pyrotechnic generator can in this case ensure the pressurization of the casing without having to inflate it completely.

The thickness of the casing will he chosen sufficient to ensure a constant gas pressure without fracturing of around 1 to 2 Mega Pascals. A rubber casing of around 8 mm in thickness will be adopted, for example.

The gas generator is of a known type, notably used for inflating automobile airbags. It can incorporate around 10 grams of a propellant (butalane a propellant including ammonium perchlorate, Al-powder and a binder as polybutadiene) or nitride type and will he initiated by means of a pyrotechnic squib.

According to this embodiment of the invention, each arm 5 also comprises a pyrotechnic actuator 9 that has a rod 9a fastened to the rigid support 3 and a body 9b linked to the vehicle. The rod 9a is able to slide with respect to the body 9b under the effect of the gases generated by one or several gas generating tablets 10a, 10b, 10c.

Each composition tablet can be initiated individually using a specific pyrotechnic igniter (not shown). The tablets are isolated from one another so that initiating one of them does not cause the initiation of the others. Each tablet can thus be placed inside a gas-tight case (not shown) fitted with a lid that can be fragmented by the gas pressure.

An electronic control system 11, integral with the vehicle, receives the signals transmitted by the impact sensors 12a, 12b, 12c that will be advantageously integral with the rigid support 3 or else with the shell 9 itself. The impact sensors are evenly spaced over the length of the bumper for reasons that will be specified later.

A sensor (12a, 12c) can be placed, for example in the vicinity of the bumper ends and another sensor (12b) at the median part.

The control system also receives the signal transmitted by a deceleration contactor 13, for example inertia-bed.

The impact sensors will be formed, for example, by fracture pins associated with electromechnical or piezoelectric contacts. These will be assembled such that fracturing the pin (occurring during impact) causes the closure or opening of the contact.

Sensors in the form of electrical contacts integral with the bar 3 can also be adopted that are fractured when said bar undergoes a certain level of strain. Stress gauges or contactors sensitive to a certain level of deceleration greater than that of contactor 13 can also be used.

The signals transmitted by sensors 12a, 12b, 12c are processed by the system 11 that incorporates a suitable algorithm allowing the initiation of one or several tablets 10a, 10b, 10c and/or the gas generator 8 to be controlled.

Advantageously, the control system 11 will also ensure the activation of the other safety systems of the vehicle (inflation of driver and/or passenger airbags, seat belt pretensioners, . . . ).

Such a bumper operates as follows.

Classically, the bumper shell structure enables it to absorb a shock occurring at a speed of less than 4 km/h.

When the speed exceeds 4 km/h, the deceleration contactor 13 is activated and the control system 11 causes the gas generator 8 to be initiated.

Since the casing 6 is already pre-inflated it is almost instantaneously pressurized by the gases generated by the generator 8 (pressurization time of around 5 ms). It still occupies the whole of the inner volume of the shell 2.

The pressurised casing allows the shock received by the shell to be spread over the whole structure and notably over the length of the rigid support 3. It also allows the deformations due to the impact, and thus the shock, to be absorbed.

Such an operating mode is controlled for a vehicle speed upon impact of between 4 km/h and 15 km/h.

The casing proposed by the invention is more effective and more reliable than that disclosed in document U.S. Pat. No. 5,651,569. Indeed, the casing is only pressurized upon impact, and there can therefore be no reduction in gas pressure during the normal operation of the vehicle. Moreover, the pressure developed can be much greater than that obtained by mere pre-inflation. This results in great shock-absorbing capabilities.

Sensors 12a, 12b, 12c detect an impact occurring at a speed of over 15 km/h.

Further to this detection, the control system causes the initiation of one or several of the gas-generating tablets 10a, 10b, 10c. The pyrotechnic actuators 9 are thus activated and allow the extra energy from the impact received to be absorbed.

Because of the presence of several impact sensors 12a, 12b, 12c spaced along the length of the bumper, the control system is able to locate the position of the impact received by the vehicle with respect to its median axis 14.

Indeed, in the case of an offset impact, and according to the sensor technology used, the signal transmitted by the impact sensor that is closest to the point of impact will be the strongest, or else the impact sensor closest to the point of impact will fracture the first.

At least two impact sensors will be provided, one on either side of the median axis 14. Each of these sensors will thus more easily detect an impact occurring on one side or the other of the median axis, thus on the right or left of the vehicle.

The control system 11 will then control the initiation of a greater number of tablets 10 for the pyrotechnic actuator 9 closest to the point of impact (for example, the three tablets 10a, 10b, 10c of the closest actuator and a single tablet for the one that is furthest away).

The effort produced by the closest actuator to the point of impact will thus be greater than that produced by the actuator that is furthest away. Such an arrangement allows the absorption of the shock to be adapted according to the position of impact with respect to the median axis 14 of the vehicle thereby preventing the vehicle from wrapping around an offset obstacle.

By way of a variant, it is possible for impact sensors to be provided that allow several impact speeds over 15 km/h to be differentiated and consequently a different number of gas-generating composition tablets to be initiated according to the violence of impact.

The higher the speed of impact, the more gas-generating composition tablets will be initiated.

By way of a variant, it is possible for a casing 6 to be provided that is not pre-inflated in its starting position.

As for the previous embodiment, this casing will be pressurized by initiating the gas generator 8. This variant of the invention has a longer reaction time and is substantially less effective than the one previously described. It is, however, more effective that the one described in patent U.S. Pat. No. 5,651,569, as the pressure obtained is greater and invariable over time.

By way of a variant, it is also possible for a bumper to be made in which the casing 6 and shell 2 form one element. All this requires is the provision of a bottom wall closing off the shell and thereby delimiting a gastight inner volume pressurised by at least one gas generator.

FIG. 3 shows a bumper 1 according to a third embodiment of the invention.

This embodiment differs from the previous one in that the single casing 6 in FIG. 2*a* is replaced by three casings 6*a*, 6*b*, 6*c* (that can also be made in the form of a single casing having inner partitions delimiting three inflatable chambers 15*a*, 15*b*, 15*c*).

Each chamber 15*a*, 15*b*, 15*c* can be pressurized by a specific gas generator 8*a*, 8*b*, 8*c* whose initiation is caused by the control system 11.

Several impact sensors 12*a*, 12*b*, 12*c* are placed along the bumper and enable the impact received to be located with respect to the median axis 14 of the vehicle.

According to the location of the impact, the control system will initiate one or other of the gas generators 8. It can also initiate all the generators if the violence of impact detected reaches a certain level.

The arms 5 of this bumper are identical to those described with reference to the previous Figures.

FIG. 4 shows a variant embodiment of the bumper according to the invention, wherein the casing 6 in FIG. 1*a* is replaced by two casings 6*a* and 6*b* each delimiting a chamber 15*a*, 15*b* that can be pressurized by means of a specific gas generator 8*a*, 8*b*. These two casings can also be formed by a single casing incorporating an inner partition delimiting the two chambers 15*a*, 15*b*.

Figure 5:
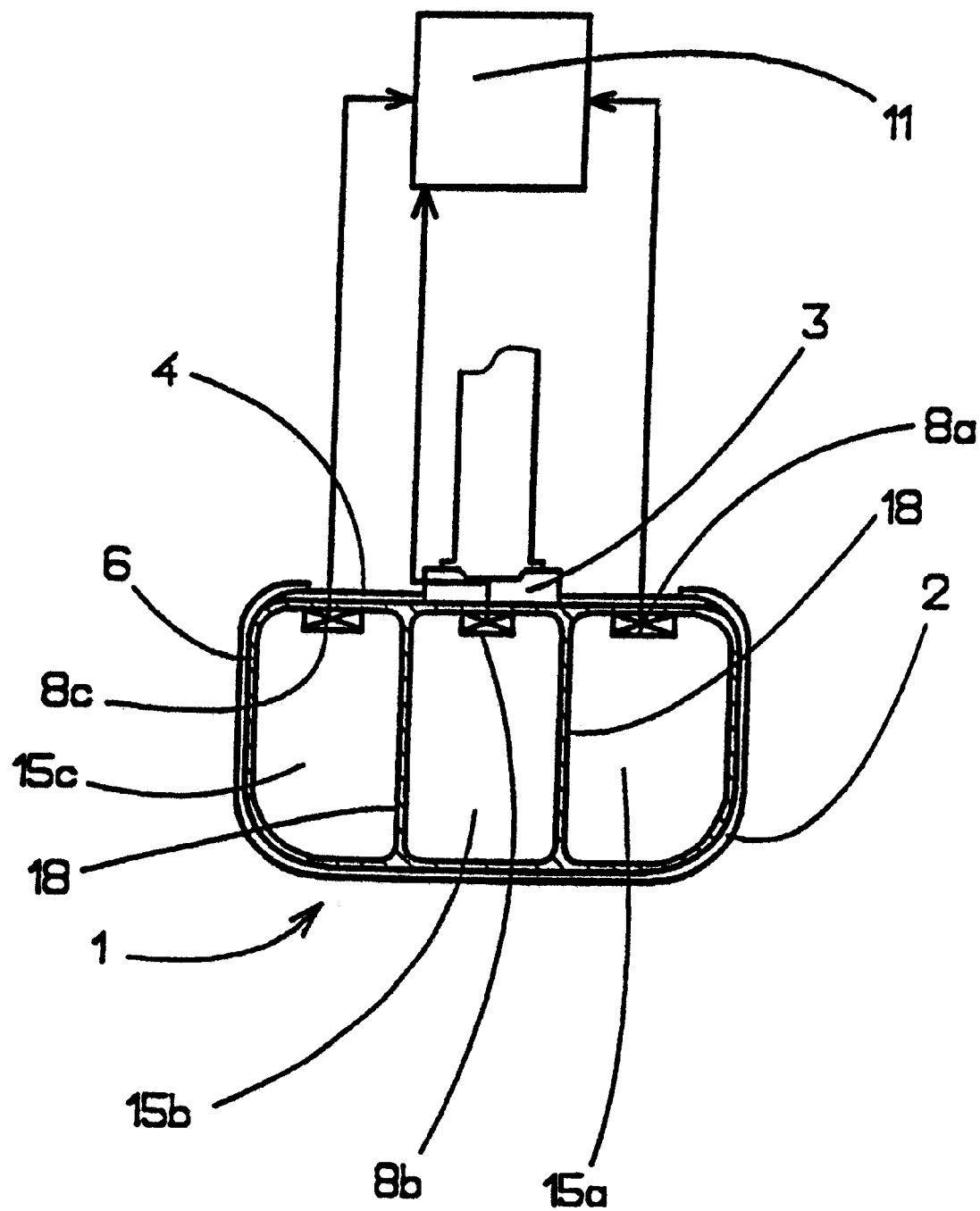
FIG. 5 is a transversal section view of another variant embodiment of the bumper according to the invention.

FIG. 5 shows another variant embodiment in which the casing 6 incorporates two longitudinal partitions 18 delimiting three inner chambers 15*a*, 15*b* and 15*c*. Each chamber can be pressurised by a specific gas generator 8*a*, 8*b* and 8*c*. Such an arrangement allows the reaction of the device to be adapted depending on the height of the impact and its energy.

In any case, partitioning the chambers allows the casings to be pressurised more quickly.

The device according to the invention can be adapted both for a front and rear bumper.

What is claimed is:

1. A bumper (1) for a vehicle, said bumper comprising a shell (2) including shock-absorbing means for damping impacts, a rigid support (3), two arms (5), a control system (11), and at least one sensor selected from the group consisting of impact sensors and deceleration sensors (12*a*, 12*b*, 12*c*), said shell (2) being attached to the rigid support, and the rigid support being linked to the vehicle by the two arms, said arms each comprising a pyrotechnic actuator (9) for exerting force on said shell, each said actuator being electrically connected to said control system (11), said control system being electrically connected to said at least one sensor (12*a*, 12*b*, 12*c*), and each pyrotechnic actuator (9) incorporating at least two gas-generating powder tablets (10*a*, 10*b*, 10*c*) each tablet capable of being primed individually by the control system (11) to energize the actuator responsive to at least two impacts of differing intensities.

2. The bumper according to claim 1, further comprising at least one means for determining position, wherein the control system (11) is electrically connected to the means for determining position for receiving a signal indicative of the point of an impact received by the vehicle with respect to a median axis (14) of the vehicle, so that the control system (11) activates the actuator nearest the point of impact, said activation producing an effort greater than the effort produced by activation of an actuator located furthest from the point of impact, said effort being a force exerted on the shell.

3. The bumper according to claim 2, wherein the means for determining position comprises at least two impact sensors (12*a*, 12*b*) one of which is disposed on each side of the median axis (14) of the vehicle.

4. The bumper according to claim 1, comprising at least one block (19) of shock-absorbing material between the rigid support (3) and the shell (2).

5. The bumper according to claim 4, wherein each shock-absorbing block (19) is formed of hollow balls arranged in a matrix of plastic material, said balls configured to be crushed under impact to the shell.

6. The bumper according to claim 1, wherein the means for determining position comprises at least one inner volume in the shell (2) configured to be pressurized by a compressible fluid supplied by a generator (8) capable of being initiated by the control system (11) linked to said at least one sensor (12, 13).

7. The bumper according to claim 6, wherein the pressurizable volume comprises at least one casing (6, 6*a*, 6*b*, 6*c*) made of an elastic material selected from the group of materials consisting of reinforced elastic materials and non-reinforced elastic materials, said casing being arranged between the rigid support (3) and the shell (2).

8. The bumper according to claim 6, wherein the casing (6, 6*a*, 6*b*, 6*c*) comprises partitions selected from the group consisting of partitions including longitudinal and transversal partitions, said partitions forming at least two inner cavities (15*a*, 15*b*) in the casing.

9. The bumper according to claim 6, wherein the at least one fluid generator is a pyrotechnic gas generator (8).

10. The bumper according to claim 9, wherein the control system (11) is connected to initiate a predetermined gas generator according to an impact parameter selected from the group consisting of impact and deceleration parameters.

* * * * *